United States Patent [19]

Huck et al.

[11] Patent Number: 4,636,367

[45] Date of Patent: Jan. 13, 1987

[54] REMOVAL OF RADIUM FROM AQUEOUS LIQUIDS

[76] Inventors: Peter M. Huck, 11720 - 37B Avenue, Edmonton, Alberta, Canada, T6J OK4; Robert C. Andrews, 46 Fletcher Place, Regina, Saskatchewan, Canada, S4V OA3; William B. Anderson, 1114-8510, 111th Street, Edmonton, Alberta, Canada, T6G 1H7

[21] Appl. No.: 544,946

[22] Filed: Oct. 24, 1983

[51] Int. Cl.$^4$ .................. C01G 56/00; C22B 60/02
[52] U.S. Cl. ...................................... 423/12; 252/631; 423/17; 423/18
[58] Field of Search ........................ 423/12, 17, 18; 252/631

[56] References Cited

U.S. PATENT DOCUMENTS

| | | | |
|---|---|---|---|
| 2,841,465 | 7/1958 | Porter | 423/18 X |
| 2,859,093 | 11/1958 | Russell et al. | 423/18 X |
| 3,449,065 | 6/1969 | Kremer | 423/12 X |
| 4,265,861 | 5/1981 | Cleary et al. | 423/17 X |
| 4,418,042 | 11/1983 | Yan | 423/17 X |

FOREIGN PATENT DOCUMENTS 531819  10/1956  Canada .................................. 423/18

OTHER PUBLICATIONS

Merritt: The Extractive Metallurgy of Uranium, Colorado School of Mines Research Institute, 1971, pp. 166-177 and 480-483.

*Primary Examiner*—Richard D. Lovering
*Attorney, Agent, or Firm*—Townsend and Townsend

[57] ABSTRACT

A process for separating radium-226 from an aqueous liquid by adding a precipitant to the liquid. The liquid, including the precipitant, is passed upwardly through a particulate bed to assist co-precipitation and removal of the radium-226. The effect is to produce a fluidized bed of the particulate bed. The process is efficient, rapid and undemanding of space, all advantages not found in the prior art.

8 Claims, 1 Drawing Figure

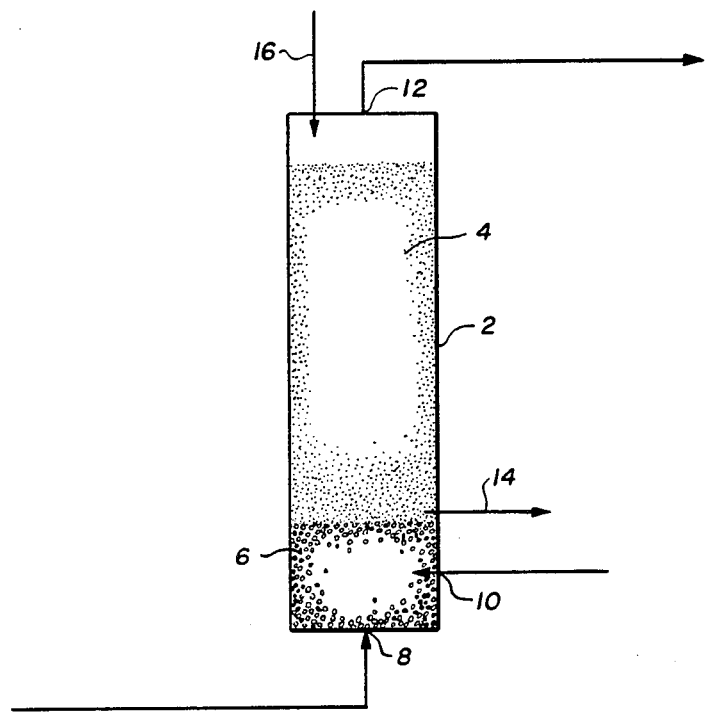

REMOVAL OF RADIUM FROM AQUEOUS LIQUIDS

FIELD OF THE INVENTION

This invention relates to a process for separating radium-226 from an aqueous liquid, particularly from the tailings decant of a uranium mine.

DESCRIPTION OF THE PRIOR ART

Uranium mining and milling operations may discharge large quantities of water to the environment from their tailings areas, depending on local climatic conditions. Tailings are, of course, the rejected portion of an ore washed away in water concentration. Typically tailings are impounded in a tailings dam or pond in mining and that is the generally accepted method in uranium mining. In the ponds the tailings are left to settle so that the solid or rejected ore settles or decants out of suspension. The decants typically contain radium-226 in quantities that significantly exceed permitted discharge levels. Treatment of tailings decants to remove radium-226 is therefore required prior to their discharge to water courses.

In the most commonly practised means of removing the radium-226 barium chloride is added to the tailings decant to remove the radium-226. Barium chloride reacts with sulphate and carbonate in the decant to produce barium sulphate and barium carbonate precipitates, both barium salts being extremely insoluble. Radium-226 is incorporated into the precipitate during formation and may also be adsorbed on the surface of the precipitate. The precipitate is then removed from the solution.

In conventional treatment systems both the precipitation and the subsequent settling are carried out in ponds or lakes.

A mechanically based treatment system has also been developed. The basic mechanical process is the same as for the ponds described above except that precipitation occurs in stirred tank reactors and the precipitate is removed from the solution by filtration rather than by mere settling.

In general existing pond systems are unable to meet currently proposed effluent standards for radium-226 in some countries. In this regard there is an increasing trend of strictness in the standards, that is the radioactive components must be present in smaller and smaller amounts if the standards are to be met. Furthermore radioactive sludge accumulates in ponds and there is considerable concern because the ponds provide a disposal problem at the end of the pond's life, for example, on mine closure.

In general the long residence times required for ponds also makes them relatively expensive when constructed to present day standards. They are also, of course, demanding of space.

As to mechanical treatment systems, they are relatively expensive to build and require skilled operation and maintenance. To date only one full scale plant has been operated, and that quite recently. The solid separation by filtration is critical and must be carefully designed. Precipitation contact times of approximately one hour or more are necessary so that reaction tanks must be large. Precipitation in tanks requires continuous energy input for the mixing.

It is therefore clear that the present means of removing radium-226 from uranium mine waste products are expensive in both time and space and yet relatively inefficient.

SUMMARY OF THE PRESENT INVENTION

The present invention seeks to provide a process for separating radium-226 from an aqueous liquid in a manner that is quick, relatively cheap and undemanding of space.

Accordingly, in its broadest aspect, the present invention is a process for separating radium-226 from an aqueous liquid by adding a precipitant to the liquid, and is the improvement that comprises passing the liquid, including the precipitant, upwardly through a particulate bed to assist co-precipitation and removal of the radium-226.

In a preferred aspect, as in the prior art, the precipitant is barium chloride. Typically the particulate bed is of sand with starting particle size of about at least 0.3 mm in diameter. The particle size increases with coating by the precipitate. If necessary a further particulate bed, for example of glass beads, can be used as a support means for the sand. A perforate plate may also be used.

The invention is of particular application as a means for removing radium-226 from the tailings decant of a uranium mine.

BRIEF DESCRIPTION OF THE DRAWING

Aspects of the invention are illustrated in the accompanying drawing which illustrates diagrammatically an apparatus useful in the process of the present invention.

DESCRIPTION OF THE PREFERRED EMBODIMENT

The drawing shows a column 2 containing a granular material 4, for example sand. If necessary the granular material may be supported on a bed 6 of a particulate material comprising larger particles, for example glass beads. The column 2 has a first inlet 8 to receive the material to be treated, the tailings decant. There is a second inlet 10 to receive a solution of precipitant, for example barium chloride. There is a first outlet 12 through which the effluent passes with almost all the radium-226 removed.

The illustrated apparatus can be operated continually, some of the precipitate loaded granular material being removed periodically through a second outlet 14 and replaced with fresh material through a third inlet 16. In the reactor 2 the radium-226 deposits on the surface of the granular material 4 contained in the reactor. The radioactive material co-precipitates, as in the prior art, by the reaction of the barium chloride precipitating barium sulphate or barium carbonate, which carries down the radioactive radium. The fluidized bed mode of operation provides a granular material 4, having a radioactive material occluded, that can be separated from the solution easily and is easily handled. The granular material is generally of sufficiently low value that the material can be disposed of directly, once it is loaded with radium.

An advantage of the process, not yet carried into effect, is that low value granular material, for example even coarse tailings from a uranium mine, could be used as the particulate material 4 in the column 2.

Because no separate solids separation step is required the process is both simpler and cheaper than the prior art. The high surface area of the particulate material 4 produces very rapid precipitation of the radium-226.

This means that the reactor 2 can be small. The solid residue containing the radium-226 is produced in an easily handled form that does not normally require dewatering. The residue can be disposed of in a number of known ways. The radioactive residue remains within an enclosed column until discharged and no mixing energy is required for the precipitation step as generally the natural head behind the tailings dam of a uranium mine can be used to operate the upflow reactor. Removal efficiency is high but can be improved even further by operating two or more columns in series. Further the equipment is compact and so can be portable for short-term use. The equipment may, for example, be skid mounted.

Radium-226 has been referred to but the process of the invention is useful to separate many radioactive isotopes, particularly of other alkaline earth metals, for example strontium and cesium. The invention is illustrated in the following examples:

EXAMPLE 1

The tailings decant from an Ontario uranium mill tailings area was treated. The mill uses the sulphuric acid leach process.

The decant was pumped upwards through a 1" diameter column containing sieved silica sand (mean diameter 0.326 mm) supported on a layer of 3 mm diameter glass beads. The unexpanded bed height of sand was 12 cms. and the flowrate was 120 mL/min (in excess of minimum fluidization velocity). Barium chloride was dosed at 4 mg/L as $Ba^{+2}$. After a 4 hour run effluent samples were collected at a port above the bed. The results were:

influent radium-226 levels:
  378 pCi/L total
  132 pCi/L dissolved.
average effluent total radium-226 over 4 hours.
  24 pCi/L for 93.6% removal.

EXAMPLE 2

Tailings decant from a Saskatchawan uranium mill tailings area was treated using the same apparatus as in Example 1. This mill also uses the sulphuric acid leach process.

The sand mean diameter was 0.505 mm with an unexpanded bed height 24 cm. A series of 11 tests were run, each 2 hours in length. The flowrates ranged from 132 to 348 mL/min. (all greater than minimum fluidization). The barium chloride dose was 16 mg/L as $Ba^{+2}$. Results were:

average influent radium levels
  389 pCi/L total
  293 pCi/L dissolved
effluent - average of 11 tests
  26 pCi/L total
  21 pCi/L dissolved

EXAMPLE 3

The conditions were as in example 2, but the influent decant levels were lower. The results achieved were:
average influent radium levels
  70 pCi/L total radium-226
  50 pCi/L dissolved radium-226
After a series of 7 tests - all total and dissolved radium-226 effluent levels were at or below 6 pCi/L.

We claim:

1. In a process for separating radium-226 from an aqueous liquid by adding a precipitant to the liquid, the improvement that comprises passing the liquid, including the precipitant, upwardly through a particulate bed to assist co-precipitation and removal of the radium-226 from the liquid, adding the precipitant to the liquid in the vicinity of an upstream end of the particulate bed to form a mixture, and imparting a sufficient flow rate to the mixture to fluidize the bed.

2. A process as claimed in claim 1 in which the precipitant is barium chloride.

3. A process as claimed in claim 1 in which the particulate bed is of sand or similar material.

4. A process as claimed in claim 3 in which the starting particle size is at least about 0.3 millimeter in diameter.

5. A process for removing radium-226 from the tailings decant of a uranium mine or mill in a particulate bed of material, the process comprising adding a precipitant to the decant to form a liquid mixture of decant and precipitant in the vicinity of an upstream end of the particulate bed, passing the mixture upwardly through the particulate, bed, and fluidizing the bed with the mixture, whereby the precipitant reacts with an ion in the decant to precipitate an insoluble salt, the insoluble salt acting to co-precipitate the radium-226 in the decant, the particulate material acting to facilitate the precipitation of the insoluble salt and the co-precipitation of the radium-226.

6. A process as claimed in claim 5 in which the precipitant is barium chloride and the decant contains sulphate or carbonate ions.

7. A process as claimed in claim 5 in which the particulate material is sand or similar material.

8. A process for removing and disposing radium-226 from the tailings decant of a uranium mine or mill, the process comprising providing an upright column of a particulate material, forming a liquid mixture of decant and precipitant in the vicinity of an upstream end of the column, flowing the mixture upwardly through the column with sufficient speed to fluidize the particulate material therein, whereby the precipitant reacts with ions in the decant to precipitate an insoluble salt, the insoluble salt acting to co-precipitate the radium-226 in the decant, the particulate material facilitating the precipitation of the insoluble salt and the co-precipitation of the radium-226, and disposing of radium-226 by intermittently withdrawing from the column particulate material to which the insoluble salt and co-precipitated radium-226 is attached.

* * * * *